United States Patent
Matsuda et al.

(10) Patent No.: US 8,025,725 B2
(45) Date of Patent: Sep. 27, 2011

(54) TEMPERATURE-SENSITIVE ALUMINUM PHOSPHATE SOLUTION, A PROCESS FOR PRODUCING THE SAME AND THE USE THEREOF

(75) Inventors: Shohei Matsuda, Hyogo (JP); Hiroaki Hani, Hyogo (JP); Koji Yamada, Hyogo (JP); Hiroyuki Moriya, Hyogo (JP); Shinichiro Orai, Hyogo (JP)

(73) Assignee: Taki Chemical Co., Ltd. (JP)

( * ) Notice: Subject to any disclaimer, the term of this patent is extended or adjusted under 35 U.S.C. 154(b) by 458 days.

(21) Appl. No.: 12/374,476

(22) PCT Filed: Dec. 11, 2007

(86) PCT No.: PCT/JP2007/001380
§ 371 (c)(1),
(2), (4) Date: Jan. 20, 2009

(87) PCT Pub. No.: WO2008/072375
PCT Pub. Date: Jun. 19, 2008

(65) Prior Publication Data
US 2009/0208638 A1  Aug. 20, 2009

(30) Foreign Application Priority Data
Dec. 13, 2006 (JP) .................. 2006-335535

(51) Int. Cl.
C01B 25/36 (2006.01)
C01B 25/45 (2006.01)
C09K 15/02 (2006.01)

(52) U.S. Cl. ............ 106/286.5; 106/14.05; 106/14.21; 106/286.2; 106/287.17; 252/397; 423/305; 423/306; 427/372.2; 427/380

(58) Field of Classification Search ............ 106/14.05, 106/14.21, 286.2, 286.5, 287.17; 252/397; 423/305, 306; 427/372.2, 380
See application file for complete search history.

(56) References Cited

U.S. PATENT DOCUMENTS

| | | | | |
|---|---|---|---|---|
| 4,089,692 A | * | 5/1978 | Toeniskoetter et al. | 106/38.35 |
| 4,138,261 A | * | 2/1979 | Adrian et al. | 106/819 |
| 4,289,739 A | * | 9/1981 | Chiang et al. | 423/306 |
| 4,335,154 A | * | 6/1982 | Benjamin et al. | 426/551 |
| 4,347,325 A | * | 8/1982 | Michel et al. | 501/1 |
| 4,375,456 A | * | 3/1983 | Chiang | 423/306 |
| 4,704,211 A | * | 11/1987 | Auel et al. | 252/1 |
| 5,425,901 A | | 6/1995 | von Bonin et al. | |
| 6,461,415 B1 | * | 10/2002 | Sambasivan et al. | 106/14.21 |
| 7,311,944 B2 | * | 12/2007 | Sambasivan et al. | 427/328 |
| 7,682,700 B2 | * | 3/2010 | Sambasivan et al. | 428/426 |
| 7,951,309 B2 | * | 5/2011 | Galembeck et al. | 252/363.5 |
| 2006/0045831 A1 | * | 3/2006 | Galembeck et al. | 423/311 |

FOREIGN PATENT DOCUMENTS

| | | |
|---|---|---|
| EP | 0236617 | 9/1987 |
| EP | 0527401 A2 | 2/1993 |
| JP | 5187514 A | 7/1976 |
| JP | 53011200 | 2/1978 |
| JP | 57-061607 A * | 4/1982 |
| JP | 61207484 | 9/1986 |
| JP | 62187105 A | 8/1987 |
| JP | 5221620 A | 8/1993 |
| JP | 7291609 A | 11/1995 |
| JP | 2000169845 | 6/2000 |
| JP | 2001192284 | 7/2001 |
| JP | 2002069657 | 3/2002 |

OTHER PUBLICATIONS

International Bureau of WIPO, "International Preliminary Report on Patentablilty" for PCT/JP2007001380, mailed Jun. 25, 2009 (5 pages). This U.S. application claims priority to PCT/JP2007001380.

* cited by examiner

*Primary Examiner* — Anthony Green
(74) *Attorney, Agent, or Firm* — Kolisch Hartwell, P.C.

(57) ABSTRACT

According to the present invention, there is provided a temperature-sensitive aluminum phosphate solution, characterized in that, composition of the aluminum phosphate is within such ranges that $3Al_2O_3/P_2O_5$ (molar ratio) is from 1.2 to 1.5, $M_2O/P_2O_5$ (molar ratio) (M is an alkali metal) is from 0.02 to 0.15 and concentration of $Al_2O_3$ is from 2 to 8% by mass and the sensing temperature is within a temperature range of from 20 to 100° C. The solution is particularly useful as an antioxidant for carbon materials.

8 Claims, 1 Drawing Sheet

TEMPERATURE-SENSITIVE ALUMINUM PHOSPHATE SOLUTION, A PROCESS FOR PRODUCING THE SAME AND THE USE THEREOF

TECHNICAL FIELD OF THE INVENTION

The present invention relates to a novel aluminum phosphate solution, to a process for producing the same and to the use thereof. More particularly, it relates to a novel aluminum phosphate solution which is useful for prevention of oxidation of carbon materials and to a process for producing the same.

BACKGROUND ART

In recent years, aluminum phosphate has been used as a binder for refractories an adhesive in various uses, a coating agent, a raw material for paints, a curing agent for alkaline substances such as water glass and silica sol (cf. Japanese Patent Application Laid-Open (JP-A) No. 011200/78), a raw material for special coating for steel plates (cf. Japanese Patent Application Laid-Open (JP-A) No. 2002-069657), an antioxidant for carbon materials, etc. and the demand therefor has been increasing year by year.

In recent years, public attention has been focused on the function of an aluminum phosphate solution as an antioxidant for carbon materials. As compared with other materials, carbon material has characteristics such as low thermal expansion coefficient, superior electric conductivity and high resistance to high temperature, thermal impact and chemicals, whereby it has been widely utilized in the fields of metallurgy, electricity, chemistry, nuclear reactor, etc. Improvements in properties and development of uses have been intensively conducted for carbon powder and carbon fiber as well as for carbon nano-tube, fullerene, etc. but there are still many problems to be solved. One of them is the degradation of carbon material caused by oxidation. As antioxidants for carbon material, aluminum compounds such as aluminum phosphate and salts of organic acids with aluminum have been proposed.

For example, a compound of aluminum monophosphate and colloidal silica is used to prevent the oxidation of graphite electrodes for arc-type electric furnaces (cf. Japanese Patent Application Laid-Open (JP-A) No. 2000-169845). Silicic materials, aluminum phosphate and a mixture thereof are used as antioxidants for graphite materials (cf. Japanese Patent Application Laid-Open (JP-A) No. 2001-192284). And an organic acid salt with aluminum is used as an antioxidant for carbon materials (cf. Japanese Patent Application Laid-Open (JP-A) No. 207484/86).

The mechanism by which aluminum phosphate serves as an antioxidant for carbon material has been presumed to be that, when a carbon material is impregnated or coated with an aluminum phosphate solution followed by drying and heating, a dehydrating condensation of aluminum phosphate proceeds on the surface or in the inner area of the carbon material to form a heat-resisting antioxidant coat which prevents a direct contact of oxygen in the air with the carbon material at high temperature. When an aluminum phosphate solution is quickly dried and heated, a non-uniform antioxidant coat may be formed due to the transfer of the component onto the surface or the surficial layer. Therefore, a non-efficient drying and heating for long time has been required.

DISCLOSURE OF THE INVENTION

Problem that the Invention is to Solve

The present invention has been created in view of the current status of the prior art and its object is to provide a novel aluminum phosphate solution which is able to form a uniform antioxidant coat on a carbon material even when dried and heated at high temperature. Another object of the present invention is to provide a novel aluminum phosphate solution having a sensing temperature within a range of 20 to 100° C. being useful in improving strength of refractories and in the use such as light-shielding glass and light control glass.

Means for Solving the Problem

The present invention relates to a temperature-sensitive aluminum phosphate solution, characterized in that, composition of the aluminum phosphate is within such ranges that $3Al_2O_3/P_2O_5$ (molar ratio) is from 1.2 to 1.5, $M_2O/P_2O_5$ (molar ratio) (M is an alkali metal) is from 0.02 to 0.15 and concentration of $Al_2O_3$ is from 2 to 8% by mass and the sensing temperature is within a range of from 20 to 100° C.

In an preferred embodiment of the present invention, the alkali metal in the aluminum phosphate solution is derived from an alkali metal salt of ultraphosphoric acid, the solution is transparent and light transmission rate at 600 nm is not less than 90% at the temperature of lower than the sensing temperature, and the solution is turbid and the light transmission rate at 600 nm is not more than 10% at the temperature of not lower than the sensing temperature.

The present invention also relates to a process for the production of the above temperature-sensitive aluminum phosphate solution, characterized in that, an alkali metal salt of ultraphosphoric acid and alumina hydrate are added to and dissolved in an aluminum phosphate solution where the composition of $3Al_2O_3/P_2O_5$ (molar ratio) is 0.9 to 1.2 so that the composition of $M_2O/P_2O_5$ (molar ratio) is made 0.02 to 0.15 and the composition of $3Al_2O_3/P_2O_5$ (molar ratio) is made 1.2 to 1.5.

The present invention further relates to an antioxidant for carbon materials (particularly, carbon electrodes) which is characterized in comprising the above temperature-sensitive aluminum phosphate solution.

The present invention still further relates to a method for format ion of an antioxidant coat on a carbon material, characterized in that, the above temperature-sensitive aluminum phosphate solution is applied to a carbon material at the temperature of lower than the sensing temperature of the temperature-sensitive aluminum phosphate solution, then the carbon material is dried at the temperature of preferably not lower than 100° C. and the carbon material is further burned.

In the present invention, the sensing temperature means the temperature boundary where an aluminum phosphate solution is able to reversibly result in a state change both from a transparent solution to a turbid solution and from a turbid solution to a transparent solution. The sensing temperature of the aluminum phosphate solution of the present invention is able to be set at the desired range of from 20 to 100° C. depending upon the object of use by changing the composition of the solution, i.e., $3Al_2O_3/P_2O_5$ (molar ratio), $M_2O/P_2O_5$ (molar ratio) and $Al_2O_3$ concentration.

In the present invention, the sensing temperature is measured as follows.

About 50 to 70 ml of a solution to be measured is placed in a 100-ml beaker at the temperature of from 10° C. to lower than 20° C. and set on a hot plate equipped with a magnetic stirrer. The beaker with a stirrer bar and a thermometer is lightly but tightly closed using a Sealon film or the like so that evaporation upon heating may be prevented. Then the temperature of the solution is raised at the rate of about 2 to 3° C. per minute together with stirring the solution in the beaker by rotating the stirrer bar, and the temperature where the solution in the beaker starts to become turbid is judged by the naked eye. The temperature at which turbidity begins observed as such is defined as a sensing temperature.

Due to the fact that a rate for raising the temperature of the solution is hard to keep constant and that the initial stage where turbidity begins is difficult to judge by the naked eye and also due to the presence of difference among individuals, the sensing temperature in the present invention may have the latitude of about ±3° C. At the temperature below the sensing temperature, the solution of the present invention becomes a transparent solution (transmission rate when the transmittance at 600 nm is measured is not less than 90%) and, when the temperature becomes not lower than the sensing temperature, it turns turbid again (transmission rate when the transmittance at 600 nm is measured is not more than 10%).

Advantages of the Invention

The novel temperature-sensitive aluminum phosphate solution of the present invention achieves very excellent effects in various fields in its practical use.

Various light control glasses have been developed and sold such as the one with a liquid crystal sheet sandwiched by two glass plates of which transparency and opaqueness are electrically controlled by on/off operations, the one where vanadium oxide which changes its optical characteristic by temperature is used as a thermochromic material and the one utilizing a photochromic material where a light-reactive element such as silver is uniformly dispersed. However, there are problems therein that methods for manufacturing them are complicated and expensive, transmittance of visible light is low, resistance to heat is low, etc.

To the contrary, when the novel temperature-sensitive aluminum phosphate solution of the present invention is sealed in a glass substrate, it is now possible to easily and less expensively prepare a light control glass where the solution sealed therein may turn white by temperature changes induced by electrical heating or environment temperature in summer and that is able to be utilized, for example, in window glass, transparent roof materials, green house for cultivation of vegetables and flowers, etc.

The novel aluminum phosphate solution of the present invention becomes a turbid state at the temperature of 100° C. or lower, which means it becomes an instable state or a metastable state at lower temperature compared with conventional aluminum phosphate solutions in the same concentration. Accordingly, when it is used as a binder for refractories, an adhesive for various materials, a coating agent, etc., a stronger bonding force may be achieved compared with conventional aluminum phosphate solutions of the same concentration such as an aluminum monophosphate solution even when dried at low temperatures such as 100 to 200° C. Since a coat is able to be formed even at low temperatures in the present invention, it is particularly effective for materials having no resistance to heat such as various kinds of synthetic resins, paper materials, glass materials and natural fiber materials.

Since the novel aluminum phosphate solution of the present invention is able to be dried at lower temperature compared with the conventional aluminum phosphate and also has a good coat-forming property, there are various advantages such as that resistance to water is also improved. As mentioned above, the novel aluminum phosphate solution of the present invention achieves excellent effects depending upon the use and the effect is most advantageously achieved when it is used as an antioxidant for carbon materials or, particularly, carbon electrodes. When a carbon material which is impregnated with a conventional aluminum phosphate solution such as an aluminum monophosphate solution or an organic acid aluminum solution such as a basic aluminum lactate solution which has been utilized for the prevention of oxidation of carbon materials is dried and heated, a phosphate component or an aluminum component impregnated may be accompanied due to vapor pressure when water contained in the solution is evaporated by drying and heating, particularly by quick drying and heating. Therefore, such a component may be transferred onto the surface or a surficial layer (hereinafter, the phenomenon of transfer of the component will be referred to as "migration") whereby the component composition may become non-uniform on the surface or the surficial layer so that no sufficient antioxidant coat will be formed while, in the inner area of the carbon material, the component for forming an antioxidant coat may be absent, non-uniform or lacking due to the migration whereby a sufficient antioxidant effect can not be always achieved. Even when drying and heating are carried out very carefully at a low speed, the migration will be resulted when temperature of the carbon material becomes high.

When the migration happens, then an antioxidant effect lowers or aluminum phosphate which is extruded due to the migration after drying is to be removed in the case of the conventional antioxidant for carbon materials where aluminum phosphate or organic acid aluminum is compounded.

In order to reduce the migration, it is necessary to conduct drying and heating having very poor efficiency such as that drying is to be conducted for long time or a gradual drying is to be done at the temperature of lower than 100° C. upon heating so as to prevent the outside extrusion of the antioxidant due to the pressure of water vapor.

When the solution of the present invention is applied to prevent the oxidation of carbon materials, there is no problem as mentioned above achieving an excellent antioxidant effect. Although the reason why the present invention achieves such an antioxidant effect is ambiguous, it is presumed that, as mentioned above, the solution of the present invention becomes turbid and is gelled above the sensing temperature and, gelling takes place even at lower temperature than sensing temperature due to instability upon an extreme reduction of water around the aluminum phosphate, and accordingly that a gel-like coat can be formed on the particles of carbon such as graphite shortly after the impregnation with a carbon material and, as a result of progress of drying and heating, phosphoric acid is condensed to form a uniform and strong coat of condensed aluminum phosphate.

To be more specific, it is presumed in the case of the solution of the present invention that, even when the vapor pressure inside becomes high due to drying and heating, the migration of the phosphate component and the aluminum component being accompanied with vapor ascending the pores in the carbon material is hardly caused due to the previously-formed gel-like coat, which results in a uniform and strong coat of condensed aluminum phosphate. The property of the solution of the present invention that it has a sensing temperature at within a range of from 20 to 100° C. is presumed to be greatly due to an alkali metal salt of ultraphosphoric acid.

Although the mechanism of the solution of the present invention which reversibly changes solution states at the temperature of 20 to 100° C. indicating having a metastable region at low temperature is ambiguous, it is presumed as follows. When the molar ratio of $3Al_2O_3/P_2O_5$ of the aluminum phosphate solution becomes more than a predetermined level, the solution becomes turbid or gelled. However, when an alkali metal salt of ultraphosphoric acid is present in the solution, the solution is stabilized below the sensing temperature due to a specific chelating effect (hereinafter, it will be referred to as the "stabilizing effect") of this salt and maintains the transparent state. On the other hand, when temperature of the solution becomes higher than the sensing temperature, the ultraphosphate which has been aligned to a specific site of aluminum phosphate contributing to a stabilizing effect is released from the specific site due to thermal energy, etc. whereupon the solution becomes instable causing a turbid state. When the temperature of the solution becomes below the sensing temperature again, the released ultraphosphate is bonded or aligned again to the original site contributing to the stabilization of the solution whereupon a stable transparent state is achieved. Thus, it is presumed that a reversible change of the solution state is achieved by the ultraphosphate. In order to maintain the reversible change of the solution state as such, it is necessary that there is water in such an amount that the ultraphosphate is able to migrate and to bind or align once again. The stabilizing effect of the ultraphosphate as such is hardly obtained in other condensed phosphates such as tripolyphosphate, hexametaphosphate and metaphosphate but is noted in the ultraphosphate only, suggesting that the chelating effect of ultraphosphate is different from that of conventional condensed phosphates.

BEST MODE FOR CARRYING OUT THE INVENTION

Figure 1:
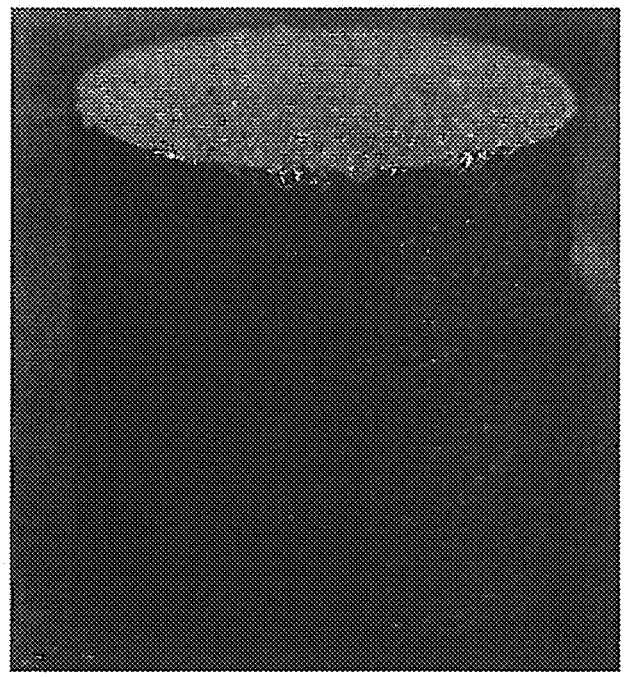
FIG. 1 shows the state of a test piece which is burned after drying for 24 hours according to Example 13.

As hereunder, the temperature-sensitive aluminum phosphate solution of the present invention will be illustrated by way of exemplification of specific producing processes and uses.

The present invention uses as a starting material a commercially available aluminum phosphate solution where $3Al_2O_3/P_2O_5$ (molar ratio) is from 0.9 to 12 called "Mono Aluminum Phosphate" which have been widely used as a chemical material, a binder for refractories and a coating agent. An aluminum phosphate solution with the above-mentioned molar ratio of $3Al_2O_3/P_2O_5$ can be easily produced by dissolving aluminum hydroxide in phosphoric acid. In a process for production of the aluminum phosphate solution according to the present invention, an alkali metal salt of ultraphosphoric acid (to be more specific, sodium salt and potassium salt of ultraphosphoric acid) is added to and dissolved in the aluminum phosphate solution with the above-mentioned molar ratio of $3Al_2O_3/P_2O_5$ so that the composition is made within such a range that $M_2O/P_2O_5$ (molar ratio) (M is alkali metal) is from 0.2 to 0.15 or, more preferably, from 004 to 0.10. When the dissolving temperature is higher, the dissolving time may be shorter. When the dissolving temperature is about 30 to 40° C., for example, dissolving time may be within 15 to 20 minutes by means of stirring. When the molar ratio of the above composition is less than 0.02, the solution could not maintain a stable state. And when it is more than 0.15, the solution could not achieve further effect since the rate of the effective aluminum phosphate components is lowered. The ultraphosphate is a kind of condensed phosphates and, for example, sodium ultraphosphate is represented by the chemical formula $(nNa_2O)P_2O_5$ ($0<n<1$). Those where n is about 0.5 to 0.8 are commercially available as sodium ultraphosphate, sodium ultrapolyphosphate and acidic sodium metaphosphate.

After that, an aluminum component (to be more specific, an alumina hydrate) is added to and dissolved in the phosphate solution prepared as such so that the composition is made within such a range that $3Al_2O_3/P_2O_5$ (molar ratio) is from 1.2 to 1.5 or, more preferably, from 1.35 to 1.45. The dissolving temperature is preferred to be lower than the sensing temperature where the state of the resulting temperature-sensitive aluminum phosphate solution changes (i.e., the temperature where the transparent state is maintained). When the dissolving temperature is higher than the sensing temperature, the solution state changes or the turbid state proceeds and, when the solution temperature is far higher, a turbid state changes to a gelled state. Even when the solution becomes turbid or gelled as such, it returns to a transparent state when temperature lowers provided that the composition is within the range of the present invention. However, when the turbid state or the gelled state continues for long time during the reaction, the reaction may not sufficiently proceed whereby that is not preferred. Therefore, in the case of producing the solution of the present invention having a sensing temperature of 60° C., it is preferred that the temperature of dissolving the aluminum component in the solution of aluminum monophosphate added ultraphosphate is about 50° C. The dissolving time is within a range of about 0.5 to 5 hour(s) and the aluminum component is added thereto and dissolved therein intermittently or continuously.

It is preferred that the manufacture of the temperature-sensitive aluminum phosphate solution of the present invention is conducted at the temperature below the sensing temperature. If a temperature-sensitive aluminum phosphate solution having a sensing temperature of below the ambient temperature is intended to be manufactured directly, the manufacture becomes very difficult due to turbidity induced during the manufacture or due to the extremely long dissolving time since an alumina hydrate or a carbonated alumina hydrate has to be dissolved at a temperature below the ambient temperature. Due to those reasons, a temperature-sensitive aluminum phosphate solution having a sensing temperature of lower than ambient temperature should be manufactured by diluting a temperature-sensitive aluminum phosphate solution having a high sensing temperature and adjusting the concentration.

When the molar ratio of the above composition is less than 1.2, the temperature-sensitive solution of the present invention is unable to be prepared while, when it is more than 1.5, significant turbidity or gelled state is resulted even at room temperature whereby the temperature-sensitive solution of the present invention is unable to be prepared as well. The aluminum component to be added in the method for the manufacture of the aluminum phosphate solution of the present invention is alumina hydrate. The alumina hydrate is usually prepared in such a manner that a water-soluble aluminum salt such as aluminum chloride, aluminum sulfate, aluminum nitrate or basic aluminum chloride is made to react with alkali metal, ammonium carbonate or bicarbonate, and the alumina hydrate which is a resulting precipitate is well washed to remove the salt. It is also possible to manufacture an alumina hydrate by the reaction of alkali aluminate with acidic gas. It is further possible to manufacture an alumina hydrate by thermal decomposition of urea in a water-soluble aluminum salt solution. It is still further possible to utilize a carbonated alumina hydrate which is prepared by the reaction of the above alumina hydrate with carbon dioxide gas (hereinafter, that including the carbonated alumina hydrate will be referred to as the "alumina hydrate" in the present invention).

Relation between sensing temperature and concentration of the solution of the present invention will be discussed as follows. When the concentration of $Al_2O_3$ is lower than 2% by mass, the sensing temperature is not higher than 20° C. and a turbid state is always resulted while, when it is more than 8% by mass, the outcome is that not only the sensing temperature is 100° C. or higher but also viscosity during the manufacture becomes too high whereby the manufacture is difficult. As such, when other conditions are constant, the sensing temperature is lower when the concentration is lower while, when the concentration is higher, the sensing temperature higher. For example, when the molar ratio of $3Al_2O_3/P_2O_5$ is constant at 1.3, the sensing temperature may be 50±3° C. and 85±3° C. when concentration of $Al_2O_3$ is 5% by mass and 7% by mass, respectively. With regard to the relation between the sensing temperature and the molar ratio of $3Al_2O_3/P_2O_5$, the sensing temperature is higher when the molar ratio of $3Al_2O_3/P_2O_5$ is smaller while, when the molar ratio of $3Al_2O_3/P_2O_5$ is higher, the sensing temperature is low in case other conditions are constant. For example, in case the concentration of $Al_2O_3$ is 5% by mass, the sensing temperature may be 90±3° C. and 40±3° C. when the molar ratio of $3Al_2O_3/P_2O_5$ is 1.25 and 1.4, respectively. With regard to the relation between the solution stability and the molar ratio of $M_2O/P_2O_5$, the solution stability becomes low when the molar ratio of $M_2O/P_2O_5$ becomes less than 0.02 whereby the manufacture becomes difficult and no improvement in the liquid stability could be achieved when the molar ratio of $M_2O/P_2O_5$ becomes more than 0.15 in case other conditions are constant.

The most desired manufacturing method according to the present invention is as mentioned above, that is, an alkali metal salt of ultrachosphoric acid is added to and dissolved in an aluminum phosphate solution prior to an alumina hydrate. When an alumina hydrate is added to an aluminum phosphate solution prior to an alkali metal salt, insoluble phosphate may be generated and, even when an ultraphosphate is added thereto, dissolving of this insoluble phosphate may be very difficult. Incidentally, the ultraphosphate should not be always added to an aluminum phosphate solution, but it can also be added to a phosphate solution during the manufacture of an aluminum phosphate solution. Since the solution of the present invention may generate some precipitates when stored for a long period, it is desired that, at that time, boric acid or organic acid is added to the solution within such an extent that temperature-sensitive property is not deteriorated. Examples of the organic acid are acetic acid, malic acid, succinic acid, tartaric acid, citric acid, oxalic acid, maleic acid, glycolic acid and adipic acid and preferred ones are oxalic acid, malic acid and succinic acid.

As mentioned above, the aluminum phosphate solution of the present invention is particularly effective for prevention of oxidation of refractories for aluminum melting furnace, jigs for sintering, sliding materials or pump impellers constituted from specific carbon materials or, more particularly, for prevention of oxidation of carbon electrodes. For further enhancement of the antioxidant effect, alumina materials such as alumina sol, silica materials such as silica sol and metal salt materials such as nickel salt may be compounded with the solution. Moreover, for enhancement of electric conductivity, carbon materials such as superfine particles of carbon black may be compounded with the solution. For improving the permeability to carbon materials and the wetting property thereof, a surfactant may be compounded with the solution. In order to form an antioxidant coat on the carbon material using the aluminum phosphate solution of the present invention, the aluminum phosphate solution of the present invention is to be applied to a carbon material at the temperature lower than the sensing temperature, then the carbon material is to be dried at the temperature of from room temperature to about 150° C. or, preferably, not lower than 100° C. and sintered at the temperature of about 800° C. As a result of the former drying, a coat of condensed aluminum phosphate may be formed while, as a result of the latter sintering, the coat may be fixed on the surface of the carbon particles to give a strong antioxidant coat. As to a method for applying the solution to the carbon material, there may be used common impregnating treatments such as impregnation by dipping, vacuum impregnation and vacuum pressure impregnation, and surficial treatments such as spray coating and coating using a brush. The aluminum phosphate solution of the present invention may permeate into pores of the carbon material and quickly form a gel-like coat layer on each of the carbon particles which prevent the migration during drying and sintering resulting in a uniform antioxidant coat. The aluminum phosphate solution of the present invention is able to be applied to a light control glass and, further, it goes without saying that, as same as the conventional aluminum phosphate solution, it is able to be utilized as a binder for refractories, a coating agent, an ingredient in paints a curing agent for water glass or the like, a chemical raw material an adhesive etc.

EXAMPLES

The present invention will now be further illustrated by way of the following Examples although the present invention is not limited thereto, in the Examples, the term % is that by mass in all cases unless otherwise mentioned.

Example 1

Sodium ultraphosphate powder (36.5 g) comprising 75.00% of $P_2O_5$ and 25.0% of $Na_2O$ (manufactured by Union K.K.; $(nNa_2O).P_2O_5$; n=0.76) was stirred/dissolved in 559.4 g of aluminum phosphate solution comprising 7.6% of $Al_2O_3$ and 31.9% of $P_2O_5$ ($3Al_2O_3/P_2O_5$ (molar ratio)=1.0) at 50 to 60° C. and then 164.9 g of alumina hydrate (13.0% of $Al_2O_3$ this alumina hydrate was prepared by such a manner that aluminum chloride was made to react with sodium carbonate and the resulting precipitated alumina hydrate was washed to remove the salt followed by drying) was gradually added thereto and dissolved therein keeping the liquid temperature at 60° C. Total amount of the dissolved solution was made 1000 g by diluting with water for adjustment to give a temperature-sensitive aluminum phosphate solution of the present invention comprising 6.4% of $Al_2O_3$, 20.66% of $P_2O_5$ and 0.91% of $Na_2O$ (the composition of $3Al_2O_3/P_2O_5$ (molar ratio)=1.30 and $Na_2O/P_2O_5$ (molar ratio)=0.10).

Transmittance at 600 nm of the solution of the present invention prepared as such was measured at 18° C. by a spectrophotometer using a 1-cm cell, and was found to be 98.7%. The solution of the present invention (70 ml) was placed in a 100-ml beaker with a stirrer bar and a thermometer, and then the beaker was set on a hot plate equipped with a magnetic stirrer and was lightly but tightly closed using a Sealon film for preventing the evaporation by heating.

After that, temperature of the solution in the beaker was raised at the rate of about 3° C. per minute together with stirring and the temperature where the solution in the beaker began to become turbid was measured by the naked eye. The turbidity started at 70° C. whereby the sensing temperature of the solution was determined to be 70° C. After the solution was kept at the temperature of 70° C. for 10 minutes, transmittance at 600 nm measured by a spectrophotometer using a 1-cm cell was 1.2%. Composition and sensing temperature of this solution are shown in Table 1.

Comparative Example 1

Under the same condition as in Example 1 except that alumina hydrate was made 90.0 g and total amount was made 848 g using water for adjustment, there was prepared an aluminum phosphate solution comprising 6.4% of $Al_2O_3$, 24.3% of $P_2O_5$ and 1.08% of $Na_2O$ having the compositions where $3Al_2O_3/P_2O_5$ (molar ratio)=1.10 and $Na_2O/P_2O_5$ (molar ratio)=0.10. The solution was heated at 100° C. for 30 minutes and the light transmittance was 98.0% resulting in no turbid state. Composition and manufactured result of this solution are shown in Table 1.

Examples 2 to 6

By the same method as in Example 1, there were prepared the temperature-sensitive aluminum phosphate solutions of the present invention comprising 5.4% of $Al_2O_3$ having the compositions where $3Al_2O_3/P_2O_5$ (molar ratio)=1.25 to 1.45 and $Na_2O/P_2O_5$ (molar ratio)=0.05 and 0.10. Sensing temperatures were determined by the same method as in Example 1. Composition and sensing temperature of these solutions are shown in Table 1.

Comparative Examples 2 to 6

By the same method as in Example 1, there was prepared the temperature-sensitive aluminum phosphate solution of the present invention comprising 5.4% of $Al_2O_3$ having the compositions where $3Al_2O_3/P_2O_5$ (molar ratio)=1.10 and $Na_2O/P_2O_5$ (molar ratio)=0.10 (Comparative Example 2). The sensing temperatures or the resulting solutions were determined by the same method as in Example 1. It was unable to manufacture an aluminum phosphate solution comprising 5.4% of $Al_2O_3$ having the compositions where $3Al_2O_3/P_2O_5$ (molar ratio)=1.60 and $Na_2O/P_2O_5$ (molar ratio)=0.10 and an aluminum phosphate solution comprising 5.4% of $Al_2O_3$ with the compositions where $3Al_2O_3/P_2O_5$ (molar ratio)=1.25 and $Na_2O/P_2O_5$ (molar ratio)=0.01 due to generation of gel during the manufacture (Comparative Examples 3 and 4). It was attempted to manufacture an aluminum phosphate solution comprising 5.4% of $Al_2O_3$ having the compositions where $3Al_2O_3/P_2O_5$ (molar ratio)=1.35 and $Na_2O/P_2O_5$ (molar ratio)=0.10 using sodium hexametaphosphate or sodium tripolyphosphate instead of sodium ultraphosphate but, even when reaction temperature, reaction time, etc. were variously adjusted, insoluble aluminum phosphate was separated out and the aimed solution was unable to be manufactured (Comparative Examples 5 and 6). Composition and manufactured result of these solutions are shown in Table 1.

TABLE 1

| | Concentration of $Al_2O_3$ (%) | $3Al_2O_3/P_2O_5$ (molar ratio) | $Na_2O/P_2O_5$ (molar ratio) | Sensing temperature (° C.) | Remarks |
|---|---|---|---|---|---|
| Example 1 | 6.4 | 1.30 | 0.10 | 70 | |
| Example 2 | 5.4 | 1.25 | 0.10 | 97 | |
| Example 3 | 5.4 | 1.35 | 0.05 | 60 | |
| Example 4 | 5.4 | 1.35 | 0.10 | 63 | |
| Example 5 | 5.4 | 1.45 | 0.05 | 25 | |
| Example 6 | 5.4 | 1.45 | 0.10 | 30 | |
| Comparative Example 1 | 6.4 | 1.10 | 0.10 | not available | no temperature for turbidity |
| Comparative Example 2 | 5.4 | 1.10 | 0.10 | not available | no temperature for turbidity |
| Comparative Example 3 | 5.4 | 1.60 | 0.10 | (manufacture impossible) | strongly gelled during reaction |
| Comparative Example 4 | 5.4 | 1.25 | 0.01 | (manufacture impossible) | gelled during reaction |
| Comparative Example 5 | 5.4 | .35 | 0.10 | (manufacture impossible) | sodium hexametaphosphate (separated out during reaction) |
| Comparative Example 6 | 5.4 | 1.35 | 0.10 | (manufacture impossible) | sodium tripolyphosphate (separated out during reaction) |

Example 7

Potassium ultraphosphate powder (36.5 g) comprising 75.0% of $P_2O_5$ and 25.0% of $K_2O$ prepared by mixing of phosphoric acid and potassium dihydrogen phosphate followed by heating and dehydrating was dissolved in 150.0 g of water. This was mixed with 559.4 g of an aluminum phosphate solution comprising 7.66 of $Al_2O_3$ and 31.9% of $P_2O_5$ and then 164.9 g of alumina hydrate (13.0% of $Al_2O_3$) prepared by the same method as in Example 1 was gradually added thereto and dissolved therein where the liquid temperature was kept at 60° C. It was diluted with water for adjustment so as to make the total amount of the solution 1,000 g to give a solution of temperature-sensitive aluminum phosphate of the present invention comprising 6.4% of $Al_2O_3$, 20.6% of $P_2O_5$ and 0.91% of $K_2O$ (the composition of $3Al_2O_3/P_2O_5$ (molar ratio)=1.30 and $K_2O/P_2O_5$ (molar ratio)=0.07). The sensing temperature of the resulting solution was determined by the same method as in Example 1. Composition and sensing temperature of this solution are shown in Table 2.

Example 8

Amount of alumina hydrate manufactured by the same method as in Example 1 and amount of water for adjustment were adjusted to prepare a solution of temperature-sensitive aluminum phosphate of the present invention comprising 5.4% of $Al_2O_3$ having the compositions where $3Al_2O_3/P_2O_5$ (molar ratio)=1.45 and $K_2O/P_2O_5$ (molar ratio)=0.10. The sensing temperature of the resulting solution was determined by the same method as in Example 1. Composition and sensing temperature of this solution are shown in Table 2.

Comparative Examples 7 to 9

By the same method as in Example 7, there were prepared the aluminum phosphate solutions comprising 5.4% of $Al_2O_3$ having the compositions where $3Al_2O_3/P_2O_5$ (molar ratio)= 1.10 to 1.60 and $K_2O/P_2O_5$ (molar ratio)=0.01 to 0.10. However, those except the aluminum phosphate solution comprising 5.4% of $Al_2O_3$ with the compositions where $3Al_2O_3/P_2O_5$ (molar ratio)=1.10 and $K_2O/P_2O_5$ (molar ratio)=0.01 (Comparative Example 7) were unable to be manufactured due to gelling during the reaction. The sensing temperatures of the resulting aluminum phosphate solutions were determined by the same method as in Example 1. Composition and manufactured result of these solutions are shown in Table 2.

TABLE 2

|  | Concentration of $Al_2O_3$ (%) | $3Al_2O_3/P_2O_5$ (molar ratio) | $K_2O/P_2O_5$ (molar ratio) | Sensing temperature (° C.) | Remarks |
|---|---|---|---|---|---|
| Example 7 | 6.4 | 1.30 | 0.07 | 60 | |
| Example 8 | 5.4 | 1.45 | 0.10 | 21 | |
| Comparative Example 7 | 5.4 | 1.10 | 0.10 | not available | no temperature for turbidity |
| Comparative Example 8 | 5.4 | 1.25 | 0.01 | (manufacture impossible) | gelled during reaction |
| Comparative Example 9 | 5.4 | 1.60 | 0.05 | (manufacture impossible) | gelled during reaction |

Comparative Example 10

Solutions where the temperature-sensitive aluminum phosphate solutions of Examples 7 and 8 were diluted so as to make concentration of $Al_2O_3$ not more than 2% were prepared, but each of them had a great variability in the sensing temperature whereby the sensing temperature was unable to be determined.

Examples 9 to 12

By the same method as in Example 1, there were prepared the aluminum phosphate solutions comprising 4.2% to 6.4% of $Al_2O_3$ having the compositions where $3Al_2O_3/P_2O_5$ (molar ratio)=1.38 and $Na_2O/P_2O_5$ (molar ratio)=0.04. The sensing temperatures of the resulting solutions were determined by the same method as in Example 1. The results are shown in Table 3. The term "approximate changing time (min)" in the table means that, when it is 5/10 (Example 9) for example, the time necessary for changing from the transparent state to the sufficient turbid state is about 5 minutes and the time necessary for changing from the turbid state to the transparent state is about 10 minutes.

TABLE 3

|  | Concentration of $Al_2O_3$ (%) | Sensing temperature (° C.) | Light transmission rate at 600 nm (%) | | Approximate changing time (min) |
|---|---|---|---|---|---|
|  |  |  | Transparent state | Turbid state |  |
| Example 9 | 4.2 | 23 | 99.5 | 0.4 | 5/10 |
| Example 10 | 4.9 | 41 | 98.9 | 0.5 | 10/20 |
| Example 11 | 5.6 | 49 | 98.5 | 0.3 | 10/20 |
| Example 12 | 6.4 | 56 | 99.4 | 1.0 | 15/25 |

Example 13 and Comparative Example 11

As a carbon material, carbonous test pieces prepared by extrusion molding (30 mm diameter×30 mm height; density: 1.75 g/cm$^3$) being able to be used as a frictional material and a sliding material for bearing, sealing, packing, etc. were used. They were impregnated, at atmospheric pressure for 10 minutes, with (1) the temperature-sensitive aluminum phosphate solution of the present invention comprising 6.4% of $Al_2O_3$, 20.6% of $P_2O_5$ and 0.91% of $Na_2O$ (the composition of $3Al_2O_3/P_2O_5$ (molar ratio)=1.30 and $Na_2O/P_2O_5$ (molar ratio)=0.10) manufactured in Example 1 (Example 13) and (2) a solution of aluminum monophosphate (7.4% of $Al_2O_3$ and 31.1% of $P_2O_5$) (Comparative Example 11), respectively, for antioxidant treatment.

Figure 2:
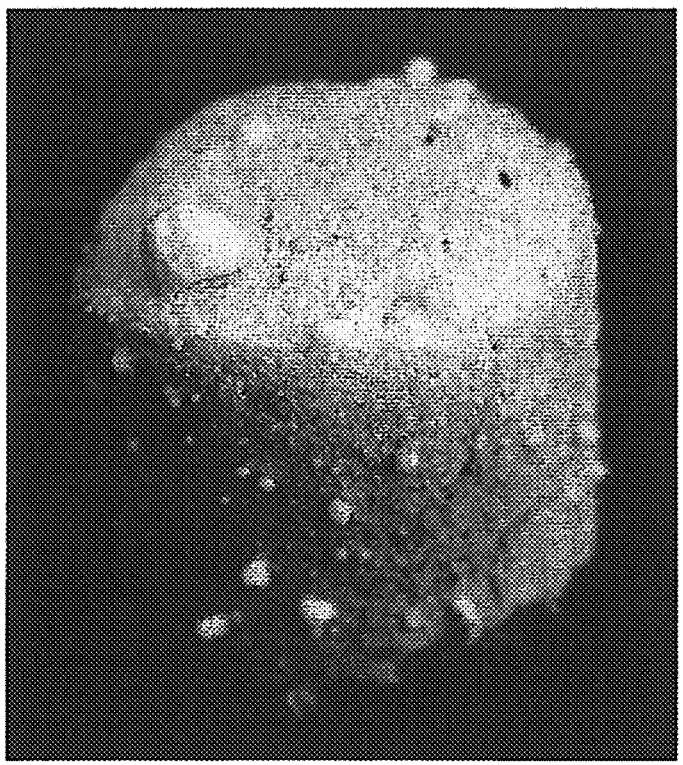
FIG. 2 shows the state of a test piece which is burned after drying for 24 hours according to Comparative Example 11.

The amount of impregnation was 1.0% to the mass of the test piece in Example 13, and was 1.5% in Comparative Example 11. The test pieces subjected to the impregnation treatment as such were dried at room temperature for 24 to 120 hours and then burned at 800° C. for 4 hours in an atmospheric environment using a box-type electric furnace. A test piece which was not subjected to an antioxidant treatment was burned as a blank. These results are shown in Table 4. Pictures of the test pieces of Example 13 and Comparative Example 11 are shown in FIG. 1 and FIG. 2, respectively.

TABLE 4

|  | Migration upon burning | |
|---|---|---|
| Drying time | Example 13 | Comparative Example 11 |
| 24 h | no migration | migration |
| 72 h | no migration | migration |
| 120 h | no migration | no migration |

Reduction in oxidation: Example 13 5.3% to 6.1%
Comparative Example 11 6.4% to 9.5%
Blank 18.0% to 21.0%

In the test piece which was subjected to an antioxidant treatment with the solution of the present invention (Example 13), no migration was observed upon burning after dried at room temperature for 24 hours while, in the test piece which was subjected to an antioxidant treatment with aluminum monophosphate (Comparative Example 11), migration was observed even after dried for 72 hours. In addition, although both Example 13 and Comparative Example 11 showed an excellent antioxidant effect, the antioxidant effect was achieved more in Example 13 than in Comparative Example 11 probably due to the non-migration upon burning. The effect of preventing the migration in Example 13 will be apparent from FIG. 1 and FIG. 2.

Example 14 and Comparative Example 12

Test pieces for a carbon electrode material were prepared by using special needle cokes (30 mm diameter×30 mm height; density: 1.79 g/cm$^3$). For antioxidant treatment, they were impregnated into the same solution as in Example 13 and Comparative Example 11, respectively, for 3 minutes under reduced pressure (−500 mm Hg) followed by returning to atmospheric pressure (those test pieces will be now referred to as Example 14 and Comparative Example 12, respectively).

The amount of impregnation was 4.7% to the mass of the test piece in Example 14, and was 7.7% in Comparative Example 12. The test pieces were then dried at 105° C. for a predetermined time and burned at 800° C. for 4 hours in an atmospheric environment using a box-type electric furnace. A test piece which was not subjected to an antioxidant treatment was burned as a blank. These results are shown in Table 5.

TABLE 5

| Drying time | Migration upon drying | |
|---|---|---|
| | Example 14 | Comparative Example 12 |
| 2 h | no migration | migration |
| 4 h | no migration | migration |
| 6 h | no migration | migration |

Reduction in oxidation: Example 14 3.1% to 3.6%
Comparative Example 12 5.1% to 5.5%
Blank 19.8% to 20.4%

Examples 15 to 17

Test pieces for a carbon electrode material (30 mm diameter×30 mm height; density-1.79 g/cm$^3$) were impregnated into the same solution as in Examples 2, 4 and 6, respectively, for 3 minutes under reduced pressure (−500 mm Hg) followed by returning to atmospheric pressure (they will be now referred to as Examples 15, 16 and 17, respectively).

The amount of impregnation was about 4% to 5% to the mass of the test pieces in Examples 15 to 17. The test pieces were then dried at 105° C. for 3 hours and the migration upon drying was checked. These results are shown in Table 6.

Comparative Example 13

The same aluminum phosphate solution as in Comparative Example 2 was used and the same treatment as in the above Examples 15 to 17 was carried out. These results are shown in Table 6.

INDUSTRIAL APPLICABILITY

Since the temperature-sensitive aluminum phosphate solution of the present invention has a sensing temperature at the range of from 20 to 100° C. which is characterized by a reversible change between a transparent state and a turbid state, it is quite useful in the fields of a binder for refractories, light control glass, etc. besides as an antioxidant for carbon materials.

The invention claimed is:

1. A temperature-sensitive aluminum phosphate solution, characterized in that, composition of the aluminum phosphate is within such ranges that $3Al_2O_3/P_2O_5$ (molar ratio) is from 1.2 to 1.5, $M_2O/P_2O_5$ (molar ratio) (M is an alkali metal) is from 0.02 to 0.15 and concentration of $Al_2O_3$ is from 2 to 8% by mass and sensing temperature is within a range of from 20 to 100° C.

2. The temperature-sensitive aluminum phosphate solution according to claim 1, wherein the alkali metal in the aluminum phosphate solution is derived from an alkali metal salt of ultraphosphoric acid.

3. The temperature-sensitive aluminum phosphate solution according to claim 1, wherein the solution is transparent and light transmission rate at 600 nm is not less than 90% at the temperature of lower than the sensing temperature, and the solution is turbid and the light transmission rate at 600 nm is not more than 10% at the temperature of not lower than the sensing temperature.

4. A process for the production of the temperature-sensitive aluminum phosphate solution according to any one of claims 1 to 3, characterized in that, an alkali metal salt of ultraphosphoric acid and alumina hydrate are added to and dissolved in an aluminum phosphate solution where the composition of $3Al_2O_3/P_2O_5$ (molar ratio) is 0.9 to 1.2 so that the composition of $M_2O/P_2O_5$ (molar ratio) is made 0.02 to 0.15 and the composition of $3Al_2O_3/P_2O_5$ (molar ratio) is made 1.2 to 1.5.

5. An antioxidant for carbon materials which is characterized in comprising the temperature-sensitive aluminum phosphate solution according to any one of claims 1 to 3.

6. The antioxidant for carbon materials according to claim 5, wherein the carbon materials are carbon electrodes.

7. A method for formation of an antioxidant coat on a carbon material, characterized in that, the temperature-sensitive aluminum phosphate solution according to any one of claims 1 to 3 is applied to a carbon material at the temperature of lower than the sensing temperature of the temperature-sensitive aluminum phosphate solution, then the carbon material is dried and the carbon material is further burned.

8. The method according to claim 7, wherein the drying is performed at the temperature of not lower than 100° C.

TABLE 6

| | Concentration of $Al_2O_3$ (%) | $3Al_2O_3/P_2O_5$ (molar ratio) | $Na_2O/P_2O_5$ (molar ratio) | Sensing temperature (° C.) | Migration upon drying |
|---|---|---|---|---|---|
| Example 15 | 5.4 | 1.25 | 0.10 | 97 | slight migration |
| Example 16 | 5.4 | 1.35 | 0.10 | 63 | no migration |
| Example 17 | 5.4 | 1.45 | 0.10 | 30 | no migration |
| Comparative Example 13 | 5.4 | 1.10 | 0.10 | not available | migration |

* * * * *